(12) United States Patent
Sakaguchi et al.

(10) Patent No.: US 8,996,267 B2
(45) Date of Patent: Mar. 31, 2015

(54) DRIVING FORCE CONTROL DEVICE FOR FOUR-WHEEL-DRIVE VEHICLE

(75) Inventors: Yusuke Sakaguchi, Wako (JP); Kouji Ono, Wako (JP); Ryuichi Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/981,324

(22) PCT Filed: Jan. 20, 2012

(86) PCT No.: PCT/JP2012/051266
§ 371 (c)(1),
(2), (4) Date: Jul. 24, 2013

(87) PCT Pub. No.: WO2012/102214
PCT Pub. Date: Aug. 2, 2012

(65) Prior Publication Data
US 2013/0304341 A1    Nov. 14, 2013

(30) Foreign Application Priority Data

Jan. 27, 2011  (JP) .................................. 2011-015841

(51) Int. Cl.
*B60K 23/08*    (2006.01)
*B60K 17/35*    (2006.01)

(52) U.S. Cl.
CPC ...... *B60K 23/0808* (2013.01); *B60W 2720/403* (2013.01); *B60W 2520/266* (2013.01); *B60K 17/35* (2013.01); *B60W 2520/10* (2013.01); *B60W 2520/28* (2013.01)
USPC .............................................. 701/69; 701/89

(58) Field of Classification Search
CPC .......... B60K 23/0808; B60K 17/3462; B60W 2520/266; B60W 2720/403

USPC ..................................................... 701/69, 89
See application file for complete search history.

(56) References Cited

U.S. PATENT DOCUMENTS 4,681,185 A * 7/1987 Hoernig et al. ............... 180/247
4,887,689 A * 12/1989 Naito ............................ 180/233

(Continued)

FOREIGN PATENT DOCUMENTS

| JP | 4-368232 A | 12/1992 |
| JP | 8-002277 A | 1/1996 |
| JP | 9-254674 A | 9/1997 |

(Continued)

OTHER PUBLICATIONS

International Search Report dated Feb. 21, 2012 corresponding to International Patent Application No. PCT/JP2012/051266.

*Primary Examiner* — Behrang Badii
*Assistant Examiner* — David Testardi
(74) *Attorney, Agent, or Firm* — Squire Patton Boggs (US) LLP (57) ABSTRACT

A driving force control device for a four-wheel-drive vehicle performs, by controlling the driving force that is allocated to the rear wheels by a front and rear torque allocation clutch that is arranged between a propeller shaft and a rear diff, the control of setting front wheels as primary drive wheels and rear wheels as auxiliary drive wheels. A control is performed to disable the allocation of driving force to the rear wheels by disengaging the front and rear torque allocation clutch, when the state that the difference in wheel speed between the left and right rear wheels is equal to or more than 80 km continues for 0.1 sec or longer in the state that the vehicle body speed is equal to or less than 120 km.

5 Claims, 7 Drawing Sheets (56) References Cited

U.S. PATENT DOCUMENTS

| | | | |
|---|---|---|---|
| 6,038,506 A * | 3/2000 | Diekhans et al. | 701/88 |
| 6,843,338 B2 * | 1/2005 | Ohtsu | 180/233 |
| 6,865,470 B2 * | 3/2005 | Ohtsu | 701/89 |
| 6,935,455 B2 * | 8/2005 | Murakami et al. | 180/244 |
| 7,197,386 B2 * | 3/2007 | Billig et al. | 701/69 |
| 7,810,601 B2 * | 10/2010 | Hamrin et al. | 180/233 |
| 2010/0121544 A1 * | 5/2010 | Kodama et al. | 701/58 |

FOREIGN PATENT DOCUMENTS

| | | | | |
|---|---|---|---|---|
| JP | 2002-234355 A | | 8/2002 | |
| JP | 2003320857 A | * | 11/2003 | ........... B60K 17/348 |
| JP | 2004122989 A | * | 4/2004 | ........... B60K 17/35 |
| JP | 2004131007 A | * | 4/2004 | ........... B60K 17/35 |
| JP | 2007-196929 A | | 8/2007 | |
| JP | 4082548 B2 | | 4/2008 | |
| JP | 4082549 B2 | | 4/2008 | |
| JP | 2010188774 A | * | 9/2010 | |

* cited by examiner

DRIVING FORCE CONTROL DEVICE FOR FOUR-WHEEL-DRIVE VEHICLE

TECHNICAL FIELD

The present invention relates to a driving force control device for a four-wheel-drive vehicle that has either of front wheels or rear wheels as primary drive wheels and the others as auxiliary drive wheels by controlling driving force allocated to either of the front wheels or rear wheels with which a four-wheel-drive vehicle is equipped.

BACKGROUND ART

As shown in the patent documents 1 and 2, a conventional four-wheel-drive vehicle is equipped, for example, with an electronically controlled driving force control device. The four-wheel-drive vehicle shown in patent documents 1 and 2 has front wheels as primary drive wheels and rear wheels as auxiliary drive wheels by controlling driving force allocated to the rear wheels by means of a driving force allocation device that is arranged between the front wheels and rear wheels. This driving force control device is equipped with a control means (FI/AT/ECU) for controlling the engine and automatic transmission and calculates total driving force of the vehicle based on FI information such as engine rotational speed, intake pipe pressure, and intake air quantity input in the FI/AT/ECU and AT information such as gear position and torque converter ratio, so as to be set to output driving torque for rear wheels appropriate to the driving mode at that time. Moreover, the driving force control device ensures driving performance on snow or rough road and protects clutch by reducing clutch slip by detecting idle running of the front wheels (or the primary drive wheels) with wheel speed sensors to perform control (or differential rotation control) such as increasing the output torque of four-wheel-drive.

CITATION LIST

Patent Documents

[Patent Document 1] JP-B-4082548
[Patent Document 2] JP-B-4082549

DISCLOSURE OF THE INVENTION

Problems to be Solved by the Invention

However, in a four-wheel-drive vehicle equipped with a conventional electronically controlled driving force control device, no protection control has been performed even when differential rotation (or speed difference) between left and right rear wheels (or driven wheels) becomes excessive due to impact of the road surface on which a vehicle runs. Therefore, when running on a road surface where frictional resistance of left and right rear wheels is significantly different (or a split μ road surface), the differential rotational speed of rear differential may become excessive and exceed the permissible limit, and, in the worst case, may lead to burn out and damage to the gear or shaft of the rear differential.

There are countermeasures against this problem is to increase the strength of rear differential by growing rear differential in size to increase its capacity or by increasing resistance (or toughness) to friction at the time of rotation by means of surface treatment of the pinion shaft with which the rear differential is equipped. However, countermeasures that increase the strength of rear differential will increase the size, weight, and cost of the four-wheel-drive mechanism including rear differential. In addition, such countermeasures may also affect the layout design of vehicle body, such as, changing the shape of the sub-frame may be necessary in order to avoid interference with the vehicle body.

Furthermore, another available countermeasure to the above-mentioned problems is to protect the rear differential by performing a control to reduce the engine torque (or an engine torque down control), when a situation is detected where the differential rotation between the left and right rear wheels becomes excessive. However, since the drive mechanisms installed in different vehicle types usually does not have the same configurations and settings, specific settings of engine torque down control also need to be differentiated. Therefore, there has been a problem that introducing engine torque down control as mentioned above for all variations of the vehicle types to be developed also affects the development costs of vehicle.

In view of the above-described problems, the present invention has an object to provide a driving force control device for a four-wheel-drive vehicle that can, with relatively simple control, effectively protect the mechanism such as differential in a situation that the differential rotation of driven wheels becomes excessive, without causing increase in size, weight, and cost of the four-wheel-drive mechanism.

Means for Solving the Problem

The present invention for solving the above-mentioned problems is a driving force control device including: in a four-wheel-drive vehicle (1) equipped with a driving force transmission route (20) that transmits driving force from a driving source (3) to front wheels (W1, W2) and rear wheels (W3, W4) and with a driving force allocation device (10) that is arranged between either of the front wheels (W1, W2) or rear wheels (W3, W4) in the driving force transmission route (20) and the drive source (3); a control means (50) that has either of the front wheels (W1, W2) or rear wheels (W3, W4) as primary drive wheels (W1, W2) and the others as auxiliary drive wheels (W3, W4) by controlling driving force allocated to either of the front wheels (W1, W2) or rear wheels (W3, W4) by means of the driving force allocation device (10); and also including: a vehicle speed detection means (S8) for detecting vehicle body speed of vehicle; and a differential rotation detection means (S3, S4) for detecting differential rotation speed between the auxiliary drive wheels (W3, W4); wherein, when the state that the differential rotation speed detected by the differential rotation detection means (S3, S4) is equal to or more than 1st threshold values (V1, V1-1) continues beyond a predetermined time (T1), when the vehicle body speed detected by a speed detection means (S8) is equal to or less than a predetermined speed (V0), the control means (50) performs the control of disabling allocation of driving force to the auxiliary drive wheels (W3, W4) by the driving force allocation device (10).

When the state that a differential rotational speed detected by the differential rotation detection means is equal to more than a 1st threshold value continues for a predetermined time or more at a vehicle body speed detected by the speed detection means being equal to or less than a predetermined speed, the driving force control device according to the present invention performs the control of disabling the allocation of driving force to the auxiliary drive wheels by the driving force allocation device, which enables to prevent the differential rotational speed between auxiliary drive wheels from exceeding an allowable range and being excessive when traveling on a road surface where the frictional resistance between the auxiliary drive wheels differs significantly. Thus, this can prevent the differential rotational speed of the differential or clutch installed between the auxiliary drive wheels from becoming excessive so as to avoid burn-out damage to the same. In addition, the above-mentioned driving force control device according to the present invention protects the mechanism such as differential or clutch installed between the auxiliary drive wheels by controlling the allocation of driving force to the auxiliary drive wheels by means of the driving force allocation device. Thus, the structure of the four-wheel-drive mechanism itself, with which a four-wheel-drive vehicle is equipped, needs not be changed from conventional ones so as to prevent excessive differential rotational speed only by changing the control program of the control means. Therefore, this will not result in increase in size, number of parts, weight and cost of the four-wheel-drive mechanism.

Moreover, in the above-mentioned driving force control device, the control means (50) should allow to allocate driving force to the auxiliary drive wheels (W3, W4) by the driving force allocation device (10), when the differential rotational speed detected by the differential rotation detection means (S3, S4) becomes equal to or less than 2nd threshold values (V2, V1-2) in the state that the allocation of driving force to the auxiliary drive wheels (W3, W4) by the driving force allocation device (10) is disabled.

In other words, when the differential rotational speed detected by the differential rotation detection means becomes equal to or less than the 2nd threshold values, the protection control of the said differential or clutch is stopped to return to the four-wheel-drive state by allocating driving force to the auxiliary drive wheels when judging that the differential rotational speed between the auxiliary drive wheels has been lowered to a speed at which there is no risk of burn-out damage to differential or clutch by allowing the allocation of driving force to the auxiliary drive wheels by means of the driving force allocation device. Since this enables return to the four-wheel-drive state at an early stage, the driving performance on a snow or rough road can be ensured.

Also, in this case, when the vehicle body speed detected by the speed detection means (S8) becomes a speed at which the stopped state of vehicle can be judged, as well as the differential rotational speed detected by the differential rotation detection means (S3, S4) becomes equal to less than 2nd threshold values (V2, V1-2), the control means (50) should desirably allow the allocation of driving force to the auxiliary drive wheels (W3, W4) by means of the driving force allocation device (10). In other words, here, by setting the vehicle stopped state as a condition for driving force allocation device to allow the allocation of driving force to the auxiliary drive wheels, affecting the behavior of vehicle due to sudden changes in driving force transmitted to the wheel side can be avoided when returning from the two-wheel-drive state that disables the allocation of driving force to the auxiliary drive wheels to the four-wheel-drive state that allows the allocation of driving force to the auxiliary drive wheels.

Furthermore, in the above-mentioned driving force control device, the control means (50) should perform the control of reducing the driving torque transmitted from the driving source (3) to the driving force transmission route (20), when the differential rotational speed detected by the differential rotation detection means (S3, S4) becomes equal to or more than a 3rd threshold value (V2-1) which is even less than a 1st threshold value (V1-1) in the state that the vehicle body speed detected by the speed detection means (S8) is equal to or less than a predetermined speed (V0), before disabling the allocation of driving force to the auxiliary drive wheels (W3, W4) by means of the driving force allocation device (10).

When disabling the allocation of driving force to the auxiliary drive wheels, idle running of the primary drive wheels may increase excessively or the acceleration applied to the vehicle body may vary greatly, due to rapid change in the driving force transmitted to the primary drive wheels. Therefore, as noted above, before disabling the allocation of driving force to the auxiliary drive wheels by the driving force allocation device, a control should be performed to reduce the driving torque to be transmitted to the driving force transmission route from the drive source when predetermined conditions are satisfied. Thus, as compared to the case that a control is performed only to disable the allocation of driving force to the auxiliary drive wheels by means of the driving force allocation device, rapid fluctuations in the driving force transmitted to the primary drive wheels can be suppressed, which allows the behavior of the vehicle to be maintained in a stable state.

Further, in this case, the control means (50) should allow the allocation of driving force to the auxiliary drive wheels (W3, W4) by means of the driving force allocation device (10) when the differential rotational speed detected by the differential rotation detection means (S3, S4) becomes equal to or less than a 2nd threshold value (V1-2) in the state that disables the allocation of driving force to the auxiliary drive wheels (W3, W4) by the driving force allocation device (10), and should control to rescind the reduction of the driving torque to be transmitted to the driving force transmission route (20) from the driving source (3) when thereafter the differential rotational speed detected by the differential rotation detection means (S3, S4) becomes equal to or less than a 4th threshold value (V2-2) that is less than even the 2nd threshold value (V1-2). According to this, since the state that the driving torque transmitted from the drive source to driving force transmission route is reduced has been continuing, even when cancelling disablement of the allocation of driving force to the auxiliary drive wheels by means of the driving force allocation device, rapid fluctuations in the driving force transmitted to the primary drive wheels can be prevented, which allows the behavior of vehicle to be maintained in a stable state. It is noted that the above characters in parentheses represent, by way of example, reference characters of components of embodiments to be described herein later.

Effects of the Invention

According to the driving force control device for a four-wheel-drive vehicle in accordance with the present invention, in a situation where the differential rotation of the driven wheels is excessive, the mechanism such as differential can be effectively protected with a relatively simple control without an increase in size, weight, number of components or cost of the four-wheel-drive mechanism.

EMBODIMENT OF THE INVENTION

Hereinafter, an embodiment of the present invention will be described in detail with reference to the appending drawings.

[First Embodiment]

Figure 1:
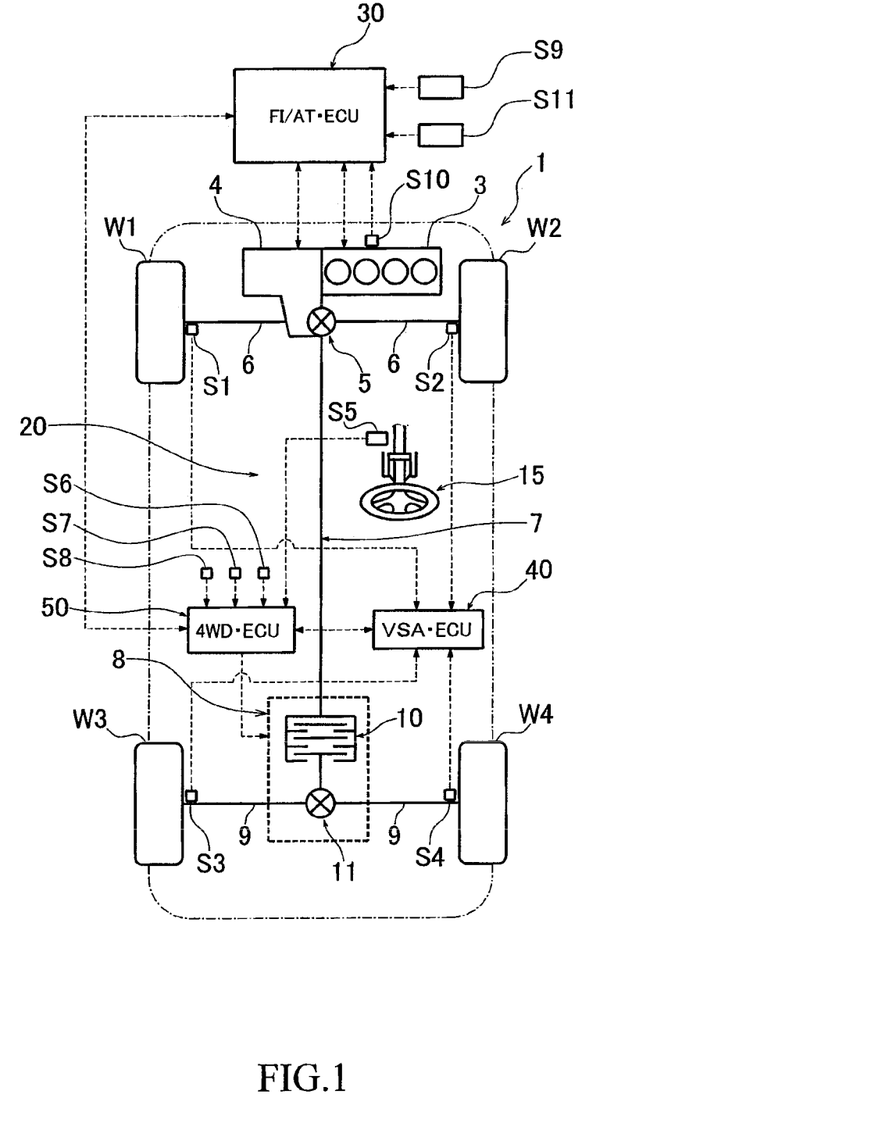
FIG. 1 is a diagram showing a schematic configuration of a four-wheel-drive vehicle equipped with a driving force control device in accordance with an embodiment of the present invention.

FIG. 1 is a diagram illustrating a schematic configuration of a four-wheel-drive vehicle equipped with a driving force control device in accordance with an embodiment of the present invention. A four-wheel-drive vehicle 1 shown in the same figure comprises: an engine (or a driving source) 3 transversely installed to the front of the vehicle; an automatic transmission 4 that is disposed integrally with the engine 3; and a driving force transmission route 20 for transmitting driving force from the engine 3 to front wheels W1, W2 and rear wheels W3, W4.

An output shaft (not shown) of the engine 3 is connected to the left and right front wheels W1, W2, that are primary drive wheels, via the automatic transmission 4, a front differential (hereinafter referred to as front diff) 5, and left and right front drive shafts 6, 6. In addition, the output shaft of the engine 3 is connected to the left and right rear wheels W3, W4 as auxiliary drive wheels, via the automatic transmission 4, the front diff 5, a propeller shaft 7, a rear differential unit (hereinafter referred to as rear diff unit) 8, and left and right rear drive shafts 9, 9.

The rear diff unit 8 is equipped with a rear differential (hereinafter referred to as rear diff) 11 for allocating driving force to the left and right rear drive shafts 9, 9, and a front/rear torque allocation clutch 10 for connecting/disconnecting the driving force transmission route from the propeller shaft 7 to the rear diff 11. The front/rear torque allocation clutch 10 is a hydraulic clutch and is a driving force allocation device for controlling allocation of driving force to the rear wheels W3 and W4 in the driving force transmission route 20. 4WD/ECU 50, which will be described later, performs a drive control with the front wheels W1, W2 as primary drive wheels and the rear wheels W3, W4 as auxiliary drive wheels by controlling driving force that is allocated to the rear wheels W3, W4 by means of the front/rear torque allocation clutch 10.

In other words, when the front/rear torque allocation clutch 10 is released (or disengaged), rotation of the propeller shaft 7 is not transmitted to the rear diff 11 side and all torque of the engine 3 is transmitted to the front wheels W1, W2, resulting in front-wheel drive (2WD) state. On the other hand, when the front/rear torque allocation clutch 10 is engaged, rotation of the propeller shaft 7 is transmitted to the rear diff 11 side, and torque of the engine 3 is allocated to both the front wheels W1, W2 and the rear wheels W3, W4, resulting in four-wheel-drive (4WD) state.

The four-wheel-drive vehicle 1 is equipped with FI/AT/ECU 30, VSA/ECU 40, and 4WD/ECU 50 that are control means for controlling drive of the vehicle. Moreover, the four-wheel-drive vehicle 1 is equipped with: a left front wheel speed sensor S1 for detecting wheel speed of the left front wheel W1 based on rotation speed of the left front drive shaft 6; a right front wheel speed sensor S2 for detecting wheel speed of the right front wheel W2 based on rotation speed of the right front drive shaft 6; a left rear wheel speed sensor S3 for detecting wheel speed of the left rear wheel W3 based on rotation speed of the left rear drive shaft 9; and a right rear wheel speed sensor S4 for detecting wheel speed of the right rear wheel W4 based on rotation speed of the right rear drive shaft 9. These four wheel speed sensors S1-S4 detect wheel speeds VW1-VW4 of the left, right, front, and rear wheels W1-W4 respectively. Detected signals of the wheel speeds VW1-VW4 are sent to VSA/ECU 40.

In addition, the four-wheel-drive vehicle 1 is equipped with: a steering angle sensor S5 for detecting steering angle of a steering wheel 15; a yaw rate sensor S6 for detecting yaw rate of vehicle body; and a lateral acceleration sensor S7 for detecting lateral acceleration of vehicle body; a vehicle speed sensor S8 for detecting vehicle body speed of vehicle (or vehicle speed), etc. Detected signals from the steering angle sensor S5, the yaw rate sensor S6, the lateral acceleration sensor S7, and the vehicle speed sensor S8 are sent to 4WD/ECU 50.

FI/AT/ECU 30 is a control means for controlling the engine 3 and the automatic transmission 4, and is configured with a microcomputer made of RAM, ROM, CPU and I/O interface (none of which is shown). Detected signals of throttle opening Th detected by a throttle opening sensor S9, detected signals of engine rotational speed Ne detected by an engine rotational speed sensor S10, and detected signals of shift position detected by shift position sensor S11 are sent to FI/AT/ECU 30. In addition, an engine torque map describing relationship between engine rotational speed Ne, throttle opening Th and engine torque estimation value Te is stored in FI/AT/ECU 30, which calculates engine torque estimation value Te is calculated based on throttle opening Th detected by the throttle opening sensor S9 and engine rotational speed Ne detected by the engine rotational speed sensor S10.

VSA/ECU 40 is a control means including: a function of ABS (Antilock Braking System) for preventing wheel lock at time of braking by performing anti-lock control of the left, right, front and rear wheels W1-W4; a function of TCS (Traction Control System) for preventing idle running of wheels at time of acceleration of vehicle; and a function of sideway skid suppression system at time of turning; and performs a vehicle behavior stability control by controlling the three functions. The VSA/ECU 40 is composed of a microcomputer, similar to the said FI/AT/ECU 30.

4WD/ECU 50 is composed of a microcomputer, as FI/AT/ECU 30 and VSA/ECU 40 are. 4WD/ECU 50, FI/AT/ECU 30, and VSA/ECU 40 are connected to each other. Therefore, detected signals of the above-mentioned wheel speed sensors S1-S4 and the shift position sensor S11, and information of engine torque estimation value Te are input into 4WD/ECU 50 via serial communication between FI/AT/ECU 30 and VSA/ECU 40. Depending on the input information, and based on control program stored in ROM, each flag value stored in RAM, and calculated values, 4WD/ECU 50 calculates driving force allocated to the rear wheels W3, W4 and corresponding hydraulic supply to the front/rear torque allocation clutch 10, as will be described later, and outputs drive signals based on said calculation result to the front/rear torque allocation clutch 10. This controls engagement force of the rear torque allocation clutch 10 so as to control driving force allocated to the front and rear wheels W3, W4.

Figure 2:
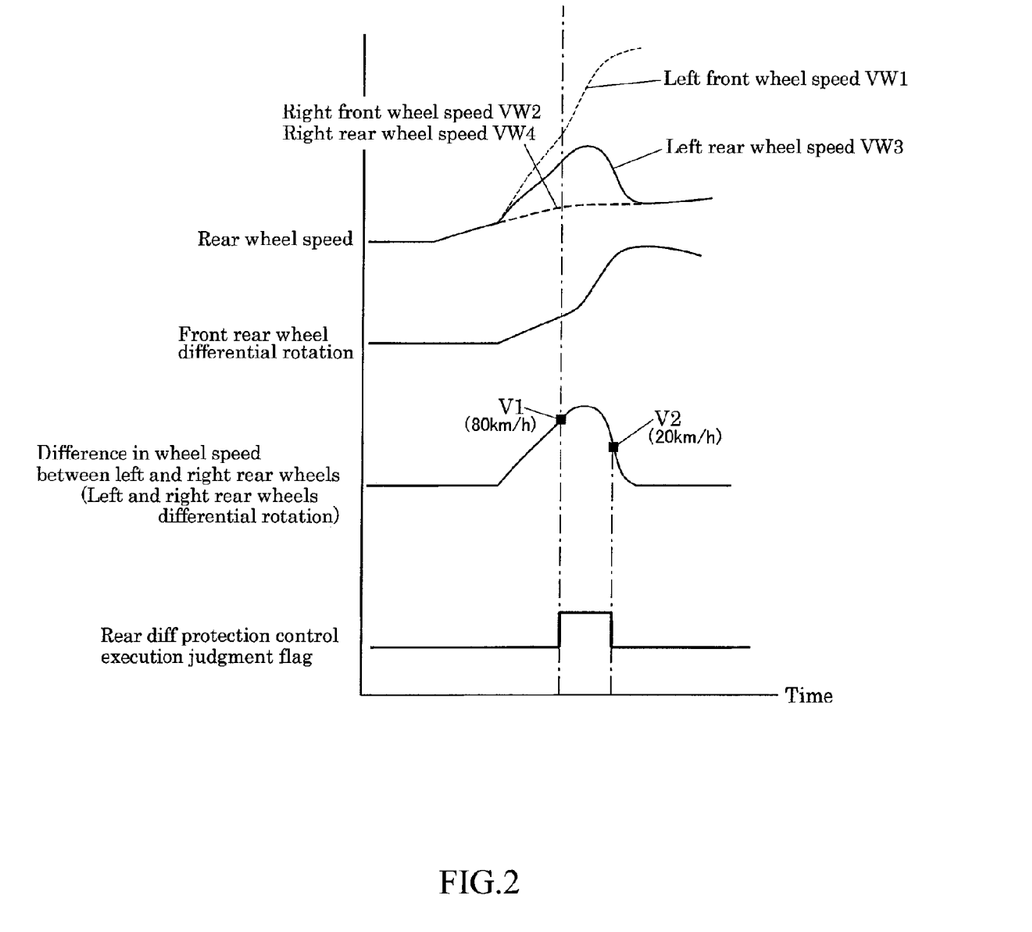
FIG. 2 is a graph showing a time chart of rear differential protection control in accordance with the 1st embodiment of the present invention.

Here, specific content of driving force allocation control (hereinafter, said control is referred to as rear diff protection control) by driving force control device in accordance with the present embodiment will be described. FIG. 2 is a graph showing a time chart of the rear diff protection control in the present embodiment. The graph in the same figure shows changes respectively in wheel speed of the rear wheels, front rear wheel differential rotation, difference in wheel speed between the left and right rear wheels (or left and right rear wheels differential rotation), and execution judgment flag of diff protection control, corresponding to elapsed time at time of the rear diff protection control. In addition to wheel speed of the rear wheels, wheel speed of the left and right front wheels W1, W2 is also shown together.

In rear diff protection control of the present embodiment, as shown in the time chart of FIG. 2, execution judgment flag of rear diff protection control is raised and the rear diff protection control is performed when the left and right rear wheels differential rotation exceeds threshold value V1 (80 km/h). Specific content of rear diff protection control here is performance of control that two-wheel-drive state is realized by disengaging (or releasing) the front/rear torque allocation clutch 10 based on instruction from 4WD/ECU 50 so as to disable allocation of driving force to the rear wheels W3, W4 (or, so as to set driving force allocation to the rear wheels W3, W4 as 0) in four-wheel-drive state where the front/rear torque allocation clutch 10 is connected and driving force is allocated to the rear wheels W3, W4 as auxiliary drive wheels.

Thereafter, when rear wheels left and right differential rotation decreases and goes below threshold value V2 (20 km/h), the execution judgment flag of rear diff protection control is cancelled to terminate rear diff protection control. Actually, taking into account safety, rear diff protection control is terminated when vehicle is stopped, as will be described later.

Figure 3:
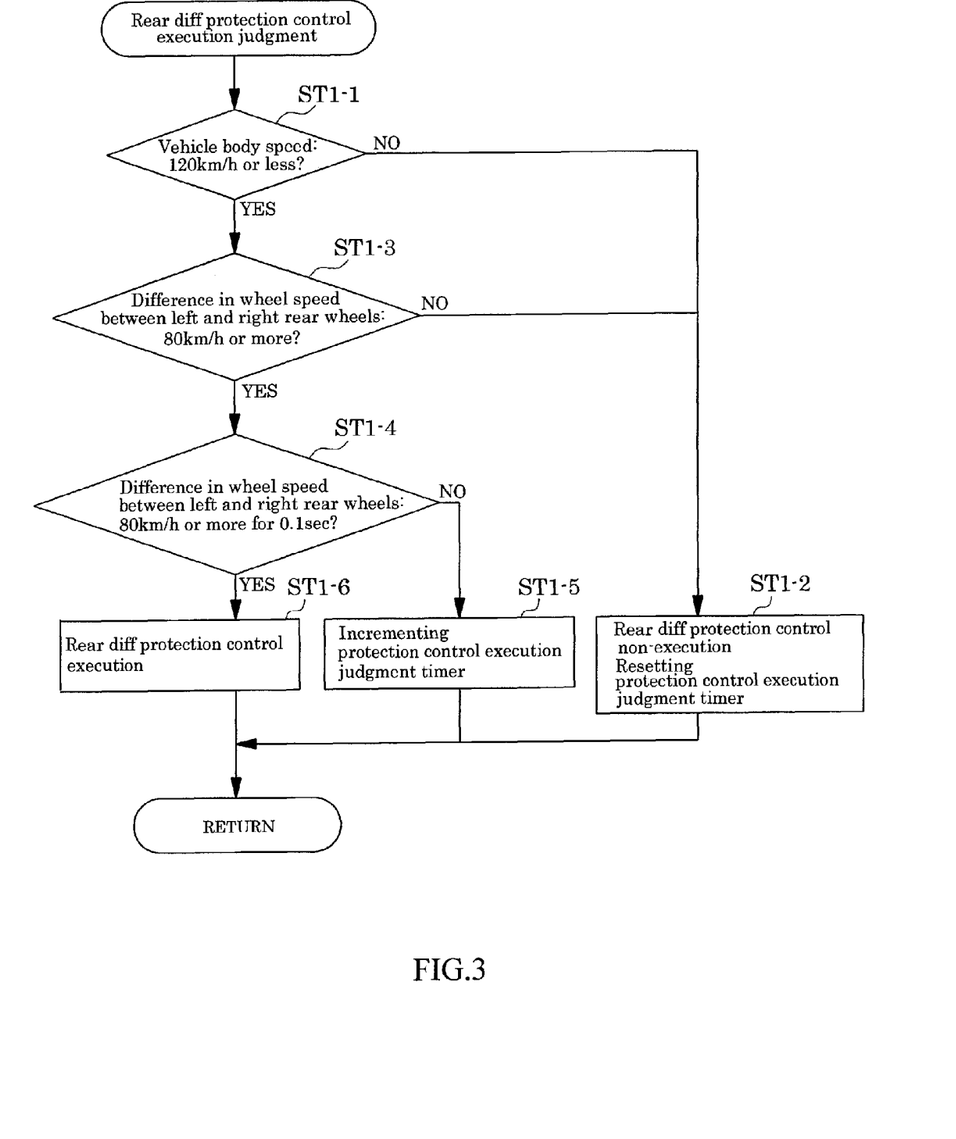
FIG. 3 is a flowchart showing an execution judgment procedure of rear differential protection control in accordance with the 1st embodiment.

FIG. 3 is a flowchart showing an execution judgment procedure of the rear diff protection control. In execution judgment of rear diff protection control, it is first judged whether or not a vehicle body speed detected by the vehicle speed sensor S8 is equal to or less than V0=120 km/h (Step ST1-1). As a result, if the vehicle body speed is not equal to or less than V0=120 km/h (NO), rear diff protection control is not performed (Step ST1-2).

At this time, if a protection control execution judgment timer of the rear diff is already incremented, the protection control execution judgment timer is reset. On the other hand, if vehicle body speed is equal to or less than V0=120 km/h (YES) in ST1-1, it is continuously judged whether or not difference between wheel speed VW3 of the left rear wheel W3 detected by the left rear wheels speed sensor S3 and wheel speed VW4 of the right rear wheel W4 detected by the right rear wheels speed sensor S4 (hereinafter referred to as: difference in wheel speed between the left and right rear wheels) is equal to or more than 80 km/h (or threshold value V1) (Step ST1-3). As a result, if the difference in wheel speed between the left and right rear wheels is less than 80 km/h (NO), rear diff protection control is not performed (ST1-2). On the other hand, if the difference in wheel speed between the left and right rear wheels is equal to or more than 80 km/h (YES) in ST1-3, it is continuously judged whether or not a state that difference in wheel speed between the left and right rear wheels is equal to or more than 80 km/h has continued for T1=0.1 sec (Step ST1-4). As a result, if duration of the state that difference in wheel speed between the left and right rear wheels is equal to or more than 80 km/h is less than T1=0.1 sec (NO), the protection control execution judgment timer is incremented (Step ST1-5). On the other hand, if the state that difference in wheel speed between the left and right rear wheels is equal to or more than 80 km/h has continued for equal to or more than T1=0.1 sec (YES), rear diff protection control is performed (Step ST1-6).

In other words, when the state that vehicle body speed is equal to or less than V0=120 km (predetermined speed) and difference in wheel speed between the left and right rear wheels is equal to or more than threshold value V1=80 km (1st threshold value) has continued for more than T1=0.1 sec (predetermined time), as rear diff protection control, 4WD/ECU 50 performs control of disengaging the front/rear torque allocation clutch 10, and disabling allocation of driving force to the rear wheels W3, W4 as auxiliary drive wheels. Further, the condition that vehicle body speed is equal to or less than V0=120 km/h in the step ST1-1 has a purpose to allow actuate protection control only at a vehicle speed at which driving torque transmitted to the rear wheels W3, W4 can be high and differential rotational speed of the rear diff 11 can exceed an allowable range to become excessive. In addition, the condition that the state that difference in wheel speed between the left and right rear wheels is equal to or more than threshold value V1=80 km/h continues for T1=0.1 sec or more in step ST1-4 has a purpose to appropriately extract a situation where differential rotational speed of the rear diff 11 can exceed an allowable range and become excessive when traveling on a road surface where frictional resistance of the left and right rear wheels W3, W4 is significantly different (or a split μ road surface).

Figure 4:
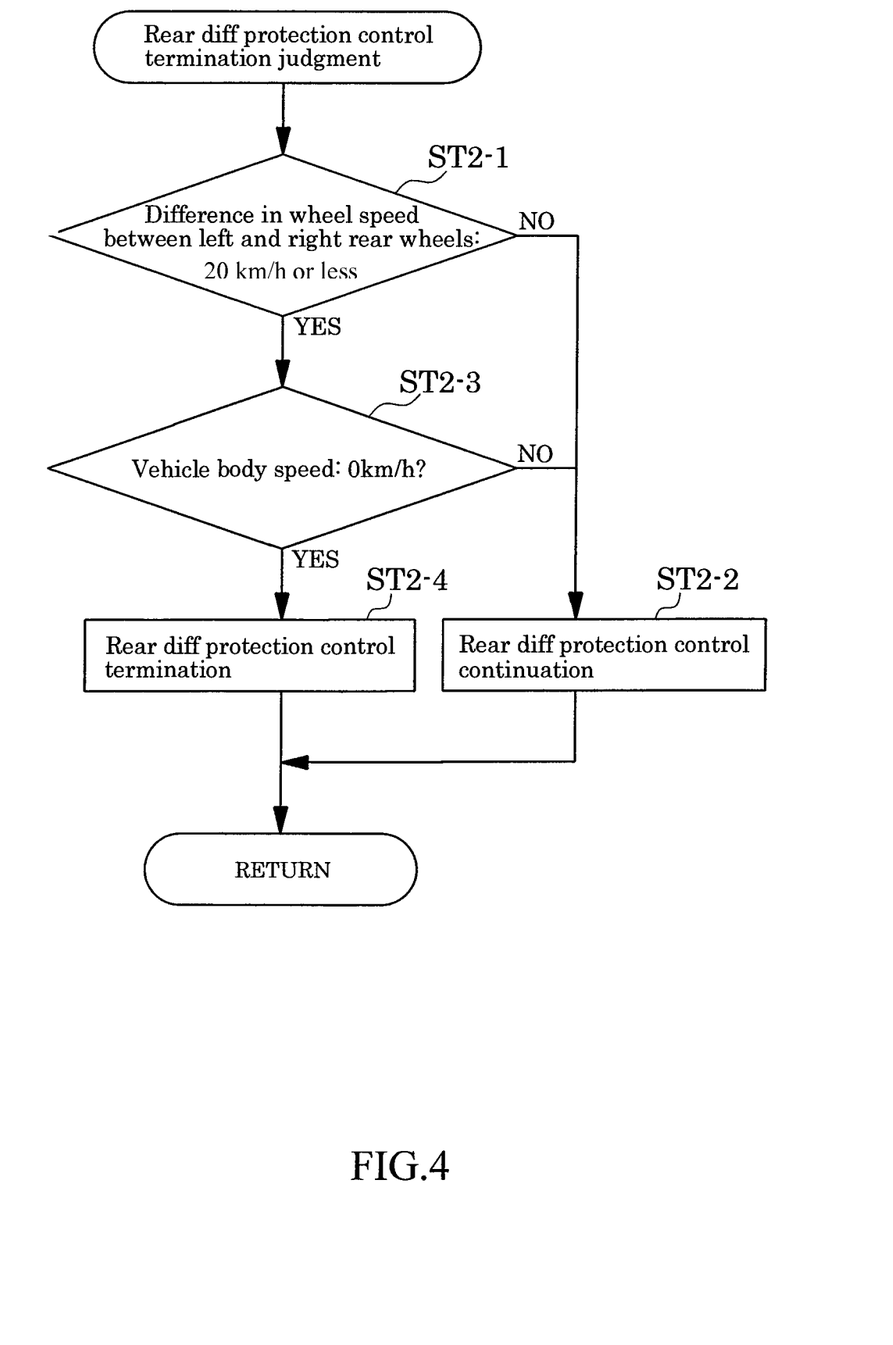
FIG. 4 is a flowchart showing a termination judgment procedure of rear differential protection control in accordance with the 1st embodiment.

FIG. 4 is a flowchart showing a termination judgment procedure of rear diff protection control. Termination judgment of rear diff protection control described below is performed during execution of the above-mentioned rear diff protection control. Here, it is first judged whether or not difference in wheel speed between the left and right rear wheels is equal to or less than 20 km/h (or threshold value V2) (Step ST 2-1). As a result, if the difference in wheel speed between the left and right rear wheels is not equal to or less than 20 km/h (NO), rear diff protection control is continued without terminating (Step ST 2-2). On the other hand, if the difference in wheel speed between the left and right rear wheels is equal to or less than 20 km/h (YES), it is judged whether or not vehicle body speed is 0 km/h or whether or not it is a stopped state (Step ST 2-3). As a result, if the vehicle body speed is not 0 km/h (NO), rear diff protection control is continued (Step ST 2-2). On the other hand, if the vehicle body speed is 0 km/h (YES), rear diff protection control is terminated to return to normal four-wheel-drive state (Step ST 2-4).

In other words, when difference in wheel speed between the left and right rear wheels becomes equal to or less than threshold value V2=20 km (or 2nd threshold value) in the state that allocation of driving force to the rear wheels W3, W4 as auxiliary drive wheels is disabled by rear diff protection control, allocation of driving force to rear wheels W3, W4 as auxiliary drive wheels is allowed. Here, the condition that difference in wheel speed between the left and right rear wheels is equal to or less than 20 km/h condition in the above-mentioned step ST 2-1 has a purpose to appropriately determine that differential rotational speed of the rear diff 11 has decreased, by performing rear diff protection control, to a rotation speed that is unlikely to cause burn-out damage. In addition, the condition that vehicle is in a stopped state in step ST 2-3 has a purpose to avoid affecting behavior of vehicle due to rapid fluctuations in driving force transmitted to the wheels W1-W4, by returning to four-wheel-drive state after vehicle is in a stopped state when terminating rear diff protection control to return from two-wheel-drive state, where rear diff protection control is performed, to four-wheel-drive state.

[Second Embodiment]

Next, a second embodiment of the present invention will be described. In the description of the second embodiment and the corresponding figures, like reference characters refer to components corresponding or equivalent to those of the first embodiment and a detailed description thereof is dispensed with. The other features than those described as below are the same as in the first embodiment. The same holds for the other embodiments of the invention.

When predetermined conditions are satisfied before disabling allocation of driving force to the rear wheels W3, W4 by means of the front and rear torque allocation clutch 10 in rear diff protection control of 1st embodiment, rear diff protection control of the present embodiment further performs control of reducing driving torque (hereinafter referred to as engine torque down control) transmitted to driving force transmission route 20 from engine 3. As a result, since rapid fluctuations in driving force transmitted to the front wheels W1, W2 can be suppressed compared to a case that only control of disabling allocation of driving force to the rear wheels W3, W4 by the front/rear torque allocation clutch 10 is performed when disabling allocation of driving force to the rear wheels W3, W4, vehicle behavior can be maintained in a stable state.

Figure 5:
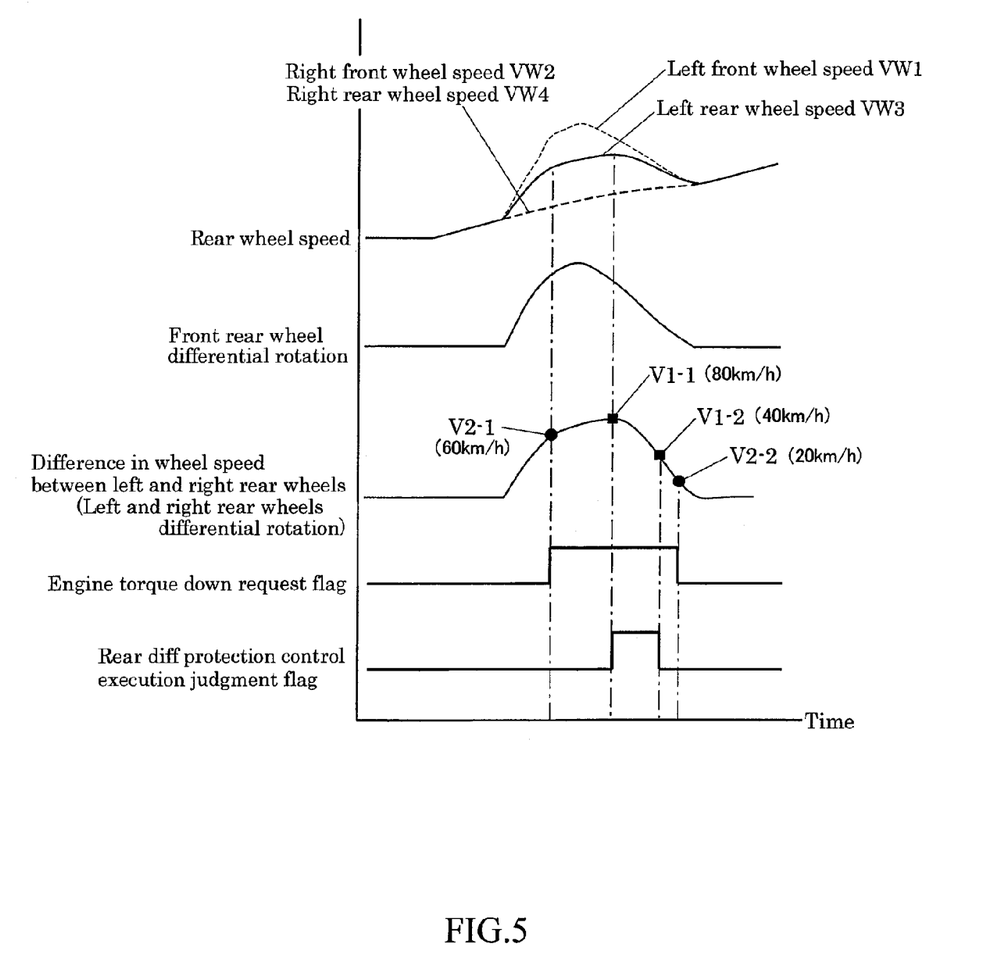
FIG. 5 is a graph showing a time chart of a rear differential protection control in accordance with the 2nd embodiment of the present invention.

FIG. 5 is a graph showing time chart of rear diff protection control in accordance with the present embodiment and corresponds to the graph in FIG. 2 of the 1st embodiment. In rear diff protection control of the present embodiment, as shown in the time chart of FIG. 5, when difference in wheel speed between the left and right rear wheels (or left and right rear wheels differential rotation) exceeds threshold value V2-1 (60 km/h), an engine torque down request flag is raised so as to perform control of engine torque down. Thereafter, when difference in wheel speed between the left and right rear wheels exceeds threshold value V1-1 (80 km/h), a rear diff protection control execution flag is raised to perform rear diff protection control. On the other hand, if difference in wheel speed between the left and right rear wheels decreases to fall below threshold value V1-2 (40 km/h), the rear diff protection control execution flag is released to terminate rear diff protection control. In addition, taking into account safety, rear diff protection control is actually terminated when the vehicle stops, as will be described later. Thereafter, if difference in wheel speed between the left and right rear wheels further decreases to fall below threshold value V2-2 (20 km/h), the engine torque down request flag is released to terminate engine torque down control.

Figure 6:
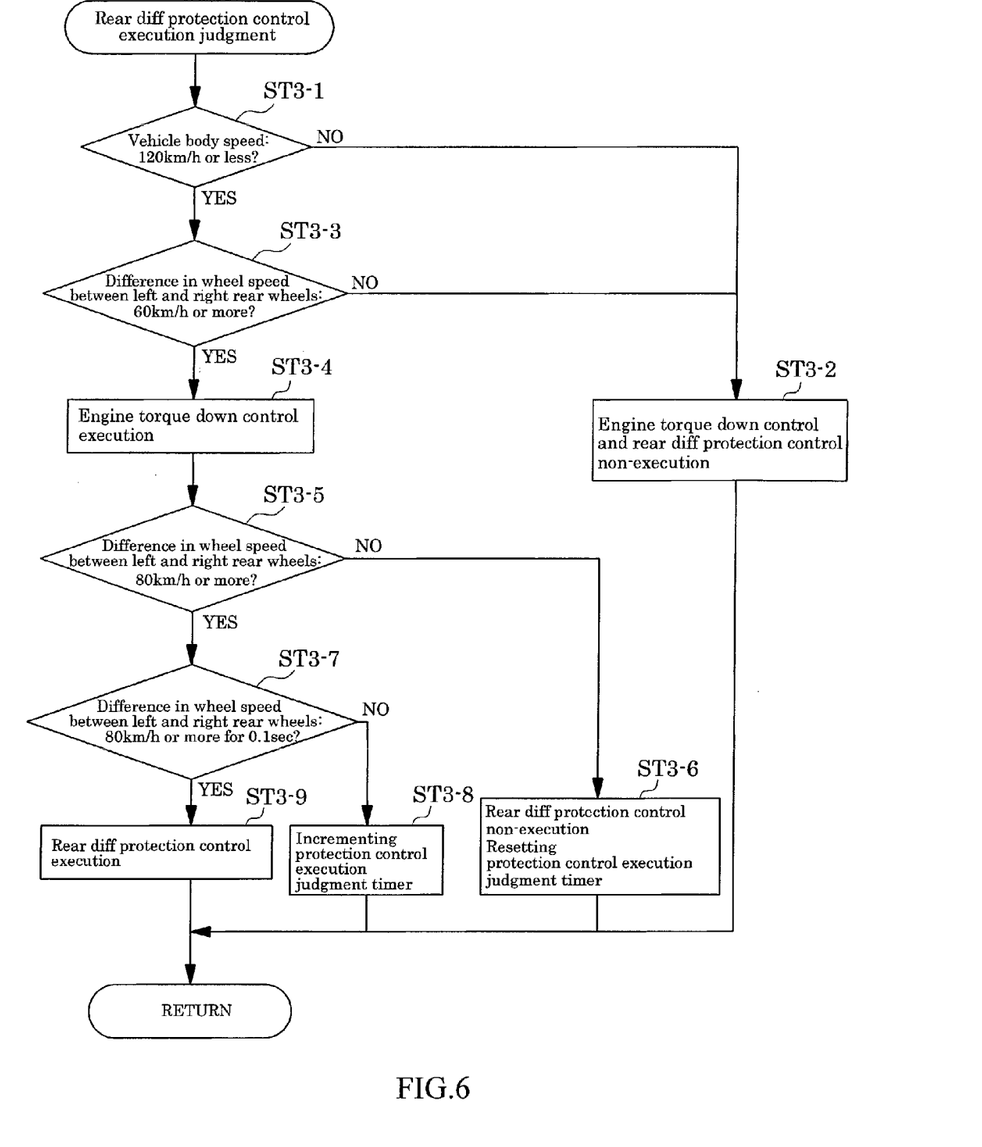
FIG. 6 is a flowchart showing an execution judgment procedure of a rear differential protection control in accordance with the 2nd Embodiment.

FIG. 6 is a flowchart showing an execution judgment procedure of rear diff protection control in the 2nd embodiment. Here, it is first judged whether or not a vehicle body speed detected by the vehicle speed sensor S8 is equal to or less than V0=120 km/h (Step ST3-1). As a result, if vehicle body speed is not equal to or less than 120 km/h (NO), neither engine torque down control nor rear diff protection control is performed (Step ST3-2). On the other hand, if vehicle body speed is equal to or less than V0=120 km/h (YES) in step ST3-1, it is continuously judged whether or not difference in wheel speed between the left and right rear wheels is equal to or more than 60 km/h (threshold value V2-1) (Step ST3-3). As a result, if difference in wheel speed between the left and right rear wheels is less than 60 km/h (NO), neither engine torque down control nor rear diff protection control is performed (Step ST3-2). On the other hand, if difference in wheel speed between the left and right rear wheels is equal to or more than 60 km/h, the engine torque down request flag is raised to perform engine torque down control (Step ST3-4). More specifically, a command necessary for reducing engine torque estimation value Te is issued from FI/AT/ECU 30 to the engine 3.

Thereafter, it is judged whether or not difference in wheel speed between the left and right rear wheels is equal to or more than 80 km/h (threshold value V1-1) (Step ST3-5). As a result, if difference in wheel speed between the left and right rear wheels is less than 80 km/h (NO), rear diff protection control is not performed (Step ST3-6). Also, at this time, if the protection control execution judgment timer has already been incremented, the rear diff protection control execution judgment timer is reset. On the other hand, in a case that difference in wheel speed between the left and right rear wheels is equal to or more than 80 km/h (YES) in step ST3-5, it is continuously judged whether or not a state that difference in wheel speed between the left and right rear wheels is equal to or more than 80 km/h has continued for T1=0.1 sec (Step ST3-7). As a result, if duration of the state that difference in wheel speed between the left and right rear wheels is equal to or more than 80 km/h is less than T1=0.1 (NO), at that time, protection control execution judgment is incremented without performing rear diff protection control (Step ST3-8). On the other hand, if the state that difference in wheel speed between the left and right rear wheels is equal to or more than 80 km/h has continued for T1=0.1 sec or more (YES) in step ST3-7, the rear diff protection control execution flag is raised to perform rear diff protection control (Step ST3-9).

In other words, in rear diff protection control of the present embodiment, when vehicle body speed is equal to or less than V0=120 km/h (or predetermined speed) and difference in wheel speed between the left and right rear wheels becomes equal to or more than threshold value V2-1=60 km (or 3rd threshold value) that is even smaller than threshold value V1-1=80 km (or 1st threshold value) for performing rear diff protection control, before disabling allocation of driving force to the rear wheels W3, W4 by disengaging the front/rear torque allocation clutch 10, control for reducing driving torque transmitted to the driving force transmission route 20 from the engine 3 (or engine torque down control) is performed.

Figure 7:
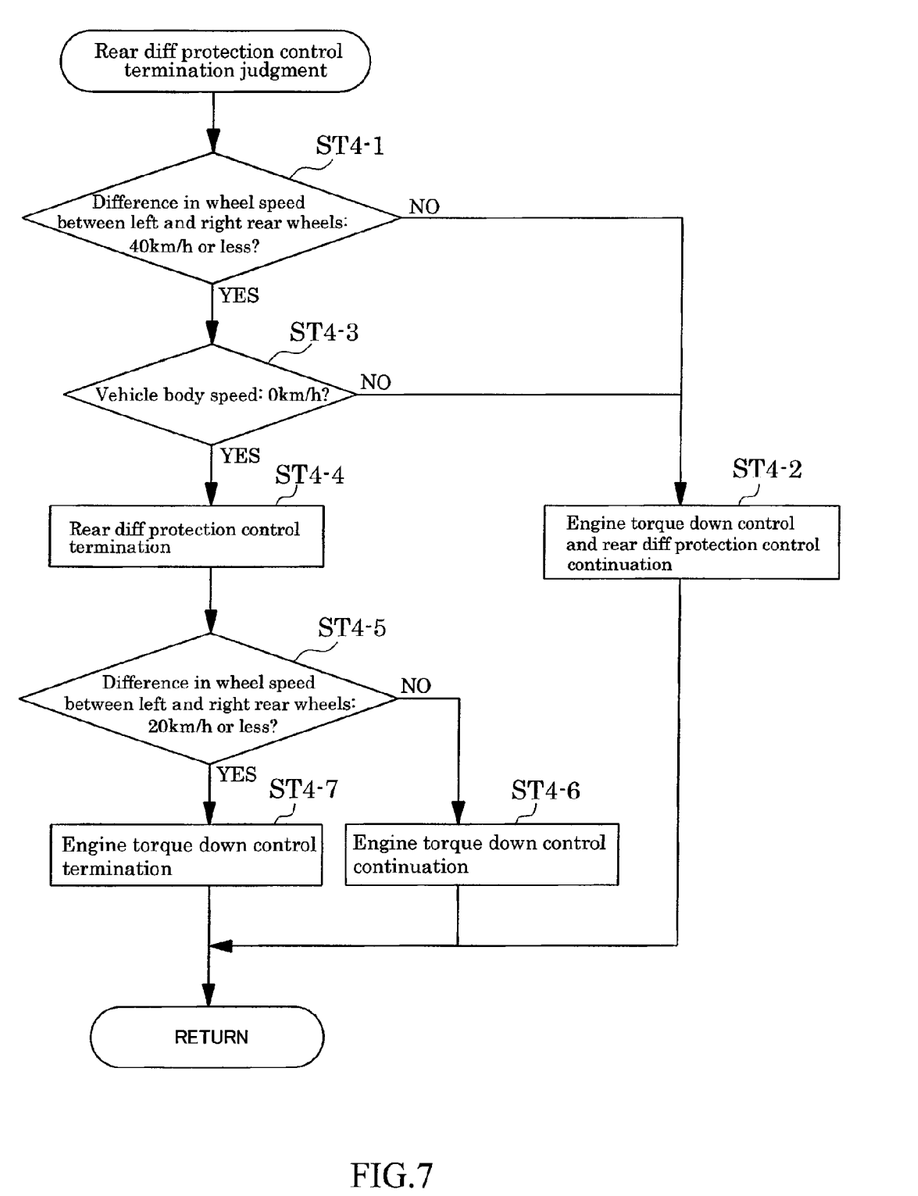
FIG. 7 is a flowchart showing a termination judgment procedure of rear differential protection control in accordance with the 2nd embodiment.

FIG. 7 is a flowchart showing a termination judgment procedure of rear diff protection control in accordance with the second embodiment. Here, it is first judged whether or not difference in wheel speed between the left and right rear wheels is equal to or less than 40 km/h (or threshold value V1-2) (Step ST4-1). As a result, if difference in wheel speed between the left and right rear wheels is not equal to or less than 40 km/h (NO), both engine torque down control and rear diff protection control are continued together (Step ST4-2). On the other hand, if difference in wheel speed between the left and right rear wheels is equal to or less than 40 km/h (YES), it is continuously judged whether or not vehicle body speed is 0 km/h or in a stopped state (Step ST4-3). As a result, if vehicle body speed is not 0 km/h (NO), both engine torque down control and rear diff protection control are continued (Step ST4-2). On the other hand, if vehicle body speed is 0 km/h (YES), rear diff protection control is terminated to return to normal four-wheel-drive state (Step ST4-4). Thereafter, it is judged whether or not difference in wheel speed between the left and right rear wheels is equal to or less than 20 km/h (or threshold value V2-2) (Step ST4-5). As a result, if difference in wheel speed between the left and right rear wheels is not equal to or less than 20 km/h (NO), engine torque down control is continued (Step ST4-6). On the other hand, if difference in wheel speed between the left and right rear wheels is equal to or less than 20 km/h (YES), engine torque down control is terminated (Step ST4-7).

In other words, in rear diff protection control of the present embodiment, when difference in wheel speed between the left and right rear wheels becomes equal to or less than threshold value V1-2=40 km (or 2nd threshold value) in a state that allocation of driving force to the rear wheels W3, W4 is disabled by the front and rear torque allocation clutch 10, allocation of driving force to the rear wheels W3, W4 as auxiliary drive wheels is allowed, and thereafter, when difference in wheel speed between the left and right rear wheels becomes equal to or less than another threshold value V2-2=20 km (or 4th threshold value) that is smaller than even threshold value V1-2, control of rescinding decrease in driving torque transmitted to the driving force transmission route 20 from the engine 3 is performed.

As rear diff protection control in the 1st embodiment, if only controlling disabling allocation of driving force to the rear wheels W3, W4 by disengaging the front/rear torque allocation clutch 10, driving force transmitted to the front wheels W1, W2 fluctuates rapidly, which may lead to an excessive increase in idle running of the front wheels W1, W2 and great variance in acceleration applied to vehicle body. Therefore, in rear diff protection control of the present embodiment, before disabling allocation of driving force to the rear wheels W3, W4, control of reducing driving torque transmitted to the driving force transmission route 20 from the engine 3 is performed when predetermined conditions are satisfied. As a result, since rapid fluctuation in driving force transmitted to the front wheels W1, W2 can be suppressed compared to a case that only control of disabling allocation of driving force to the rear wheels W3, W4 is performed, vehicle behavior can be maintained in a stable state.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof. For example, each specific numerical value of various set values (vehicle speed V0, threshold values for difference in wheel speed between the left and right rear wheels V1, V2, V1-1, V1-2, V2-1, and V2-2) for judging execution and termination of rear diff protection control and engine torque down control described in each of the above-mentioned embodiments is an example, and specific numerical values of each set value may be other values. In addition, the above-mentioned embodiment shows a case that vehicle is judged to be in a stopped state when vehicle body speed is 0 km/h. However, vehicle can also be judged to be in a stopped state when vehicle body speed is other than said 0 km/h.

Further, in the above-mentioned embodiment, as a condition for terminating ref protection control, it is required that difference in wheel speed between the left and right rear wheels has become equal to or less than threshold value V2 (V1-2), and vehicle body speed has become 0 km/h (vehicle stopped state). However, in addition, only a case that only difference in wheel speed between the left and right rear wheels has become equal to less than threshold value V2 (V1-2) can be set as a condition.

The invention claimed is:

1. A driving force control device used in a four-wheel-drive vehicle that has a driving force transmission path that transmits driving force from a driving source to front wheels and rear wheels and a driving force allocation device arranged between the driving source and either the front wheels or rear wheels in the driving force transmission path comprising:
   a control means that controls driving force allocated to either the front wheels or rear wheels by means of the driving force allocation device in order to make some of the wheels function as primary drive wheels and the others as auxiliary drive wheels;
   a vehicle speed detection means for detecting vehicle body speed of the four-wheel-drive vehicle; and
   a differential rotation detection means for detecting a differential rotation speed between the auxiliary drive wheels;
   wherein, when the vehicle body speed detected by speed detection means is equal to or less than a predetermined speed,
   the control means is configured to judge whether or not the differential rotation speed between the auxiliary drive wheels is equal to or more than a 1st threshold value and then judge whether or not a state that the differential rotation speed is equal to or more than the 1st threshold value continues beyond a predetermined time, in order to disable an allocation of driving force to the auxiliary drive wheels by the driving force allocation device when the state that the differential rotation speed is equal to or more than the 1st threshold value continues beyond the predetermined time.

2. A driving force control device for the four-wheel-drive vehicle according to claim 1, wherein the control means is configured to allow the driving force allocation device to allocate driving force to the auxiliary drive wheels, when differential rotational speed detected by the differential rotation detection means becomes equal to or less than a 2nd threshold values in a state that allocation of driving force to the auxiliary drive wheels by the driving force allocation device is disabled.

3. A driving force control device for the four-wheel-drive vehicle according to claim 1, wherein the control means is configured to allow the driving force allocation device to allocate driving force to the auxiliary drive wheels, when the differential rotational speed detected by the differential rotation detection means becomes equal to or less than a 2nd threshold value and the vehicle speed detected by the speed detection means becomes a speed at which a stop of the vehicle can be judged in a state that allocation of driving force to the auxiliary drive wheels by driving force allocation device is disabled.

4. A driving force control device for the four-wheel-drive vehicle according to claim 1, wherein the control means is configured to perform control of reducing driving torque transmitted from the driving source to the driving force transmission path, when the differential rotational speed detected by the differential rotation detection means becomes equal to or more than a 3rd threshold value which is even less than the 1st threshold value in a state that vehicle body speed detected by the speed detection means is equal to or less than the predetermined speed, before disabling the allocation of driving force to the auxiliary drive wheels by means of the driving force allocation device.

5. A driving force control device for the four-wheel-drive vehicle according to claim 4 wherein the control means is configured to allow the driving force allocation device to make allocation of driving force to the auxiliary drive wheels when differential rotational speed detected by the differential rotation detection means becomes equal to or less than the 2nd threshold value in a state that allocation of driving force to the auxiliary drive wheels by the driving force allocation device is disabled, and then to control to rescind reduction of driving torque to be transmitted to the driving force transmission path from the driving source when thereafter differential rotational speed detected by the differential rotation detection means becomes equal to or less than a 4th threshold value that is less than even the 2nd threshold value.

* * * * *